United States Patent
Cromer et al.

(10) Patent No.: US 7,936,676 B2
(45) Date of Patent: May 3, 2011

(54) AUTONOMIC LOAD BALANCING IN WIRELESS LOCAL AREA NETWORKS

(75) Inventors: Daryl Carvis Cromer, Apex, NC (US); Philip John Jakes, Durham, NC (US); Howard Jeffrey Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 2442 days.

(21) Appl. No.: 10/742,500

(22) Filed: Dec. 19, 2003

(65) Prior Publication Data

US 2005/0135316 A1   Jun. 23, 2005

(51) Int. Cl.
*H04L 12/26* (2006.01)
(52) U.S. Cl. ............ 370/235; 370/237; 370/236.1; 370/236.2; 370/230.1; 370/230
(58) Field of Classification Search .......... 370/229, 370/230, 230.1, 231, 232, 233, 234, 235, 370/236, 236.1, 237, 236.2, 238, 238.1, 254, 370/255, 256, 338, 431, 433, 437, 447, 462
See application file for complete search history.

(56) References Cited

U.S. PATENT DOCUMENTS

| | | | |
|---|---|---|---|
| 5,793,765 A | 8/1998 | Boer et al. | |
| 5,912,921 A | 6/1999 | Warren et al. | |
| 6,002,918 A | 12/1999 | Heiman et al. | |
| 6,091,725 A | 7/2000 | Cheriton et al. | |
| 6,198,728 B1 | 3/2001 | Hulyalkar et al. | |
| 6,351,468 B1 | 2/2002 | LaRowe, Jr. et al. | |
| 6,351,773 B1 * | 2/2002 | Fijolek et al. | 709/228 |
| 6,469,991 B1 | 10/2002 | Chuah | |
| 6,522,881 B1 | 2/2003 | Feder et al. | |
| 6,674,403 B2 * | 1/2004 | Gray et al. | 342/463 |
| 6,799,054 B2 * | 9/2004 | Shpak | 455/525 |
| 6,804,532 B1 * | 10/2004 | Moon et al. | 455/552.1 |
| 6,891,820 B1 * | 5/2005 | Pham et al. | 370/338 |
| 6,961,573 B1 * | 11/2005 | Moon et al. | 455/445 |
| 7,035,243 B2 * | 4/2006 | Shpak | 370/338 |
| 7,113,497 B2 * | 9/2006 | Cromer et al. | 370/338 |
| 7,203,183 B2 * | 4/2007 | Cromer et al. | 370/338 |
| 2003/0210672 A1 * | 11/2003 | Cromer et al. | 370/338 |

\* cited by examiner

*Primary Examiner* — Pankaj Kumar
*Assistant Examiner* — Mark A Mais
(74) *Attorney, Agent, or Firm* — Patrick J. Daugherty; Driggs, Hogg, Daugherty & Del Zoppo Co., LPA

(57) ABSTRACT

A wireless network access point is described which provides the resources of a backbone network to wireless clients. The access point is able to balance loads by deferring association of new clients and thereby directing clients to associate with alternative access points having improved backbone connectivity. Where the client is unable to find an alternative access point, the client will eventually make a second association request to the access point. The access point, in identifying the second association request of the client, proceeds to associate the client in response to the second association request. Specific time limits can be imposed relative to the second association request.

30 Claims, 6 Drawing Sheets

Fig. 5

| Associated Clients 502 | IP Address 504 | Average Bandwidth 506 (Mbps) | Aggregate Bandwidth 508 | Clients Pending 510 | Last Beacon Timestamp 512 | | | |
|---|---|---|---|---|---|---|---|---|
| 1 | | | | | | | | |
| 2 | | | | | | | | |
| 3 | | | | | | | | |
| ... | | | | | | | | |
| n | | | | | | | | |

250

AUTONOMIC LOAD BALANCING IN WIRELESS LOCAL AREA NETWORKS

BACKGROUND of the INVENTION

This invention pertains to wireless networking systems and, more particularly, to a wireless network access point which provides the resources of a backbone network to wireless clients. The access point is able to balance loads by deferring association of new clients and thereby directing clients to associate with alternative access points having improved backbone connectivity.

Within the past two decades, the development of raw computing power coupled with the proliferation of computer devices has grown at exponential rates. This phenomenal growth, along with the advent of the Internet, has led to a new age of accessibility to other people, other systems, and to information.

The simultaneous explosion of information and integration of technology into everyday life has brought on new demands for how people manage and maintain computer systems. The demand for information technology professionals is already outpacing supply when it comes to finding support for someone to manage complex, and even simple computer systems. As access to information becomes omnipresent through personal computers, hand-held devices, and wireless devices, the stability of current infrastructure, systems, and data is at an increasingly greater risk to suffer outages. This increasing complexity, in conjunction with a shortage of skilled information technology professionals, points towards an inevitable need to automate many of the functions associated with computing today.

Autonomic computing is one proposal to solve this technological challenge. Autonomic computing is a concept to build a system that regulates itself much in the same way that a person's autonomic nervous system regulates and protects the person's body.

Within the past decade, there has been accelerated growth in portable computing to meet the demands of a mobile workforce. This voluminous mobile workforce has traditionally relied on a cable connection to a backbone network in order to have access to resources such as printers, e-mail servers, databases, storage, and even Internet connections. Within the past few years alone, the industry has seen rapid deployment of wireless local area networks which offer increased convenience over cable connections to backbone networks. In addition to convenience, wireless networks offer the ability to roam while maintaining a network connection.

Recently, a standard for wireless local area networks known as the IEEE 802.11 standard has been adopted and has gained acceptance among the industrial, scientific and medical communities. The IEEE 802.11 standard for wireless networks is a standard for systems that operate in the 2,400-2,483.5 MHz industrial, scientific and medical (ISM) band. The ISM band is available worldwide and allows unlicensed operation of spread spectrum systems. The IEEE 802.11 RF transmissions use multiple signaling schemes (modulations) at different data rates to deliver a single data packet between wireless systems.

In a wireless local area network, wireless clients obtain access to resources on the backbone network through the use of an access point. The backbone network is typically on a wired network, such as ethernet, but can also be a second wireless network or any combination thereof. When an access point provides connectivity to resources directly on a wired network, the access point will contain, amongst other things, a wired LAN interface, a bridge function, and a wireless LAN interface in order to bridge traffic between the wireless network and the wired network.

Most installations use wireless local area networks as an overlay to an existing ethernet (cabled or wired) network which serves as a backbone or provides access to a backbone and its resources. Typically, access points are provided at various locations to create continuous geographical coverage for the wireless network. Since 802.11 is limited to 30 meters in range and Ethernet is physically limited to 100 meters in length, office environments typically deploy several access points on different backbones. The various wireless access points are assigned to different wireless frequency spectra or channels to allow overlap between wireless ranges.

Wireless clients are implemented such that they associate with an access point based on which access point is detected first or by a predetermined user preference list. Clients beacon for access and, according to present practice, all access points within reach of the beacon respond. Clients connect to the access point that its highest on the predetermined user preference list. Where there is no match between access points on the predetermined user preference list and the access points responding, the client will connect to the access point having the highest signal quality. Based on the connection, the client associates and remains associated with that access point as long as the connection remains, regardless of the number of clients.

A problem arises, however, as a result of clients associating based on highest signal quality or preference list order. It has been discovered that such a technique for associating tends to crowd clients around certain access points while leaving other access points relatively unused even though their signal quality is acceptable. Passive scanning devices aggravate the problem by listening for traffic which more often than not leads the client to associate with access points which are already crowded. If a small percentage of clients start moderate throughput transfers, the majority of clients will have little bandwidth available. In this scenario, all clients being serviced by the access point will experience degradation in performance. Meanwhile, other reachable access points may have less traffic and therefore better bandwidth. This unbalanced access point load is problematic because users are left waiting when attempting to access network resources. Additionally, capital invested on infrastructure is wasted since additional access points have been provided but tend to remain unutilized.

A challenge found, however, is in mitigating imbalanced access point load according to autonomic computing principles.

SUMMARY OF THE INVENTION

It has been discovered that the aforementioned challenges are resolved by implementing access points to defer association of clients in such a manner that clients tend to associate to various access points rather than crowding a single access point. When an access point receives from the client a request to associate, rather than associating the client, the access point notes the identity of the client making the request. The client will then attempt to associated to another access point as a result of not completing the association. In the case that the client is unable to find an alternative access point to associate with, the client will eventually make a second association request to the access point. The access point, in identifying the second association request of the client, proceeds to associate the client in response to the second association request. The underlying presumption of accepting the second association request being that the client has no other access point available. As a result of deferring the association, the client may find an alternative access point. Thus, load balancing is achieved while at the same time clients which have no other access points available are eventually associated regardless.

In one embodiment, in addition to identifying the client upon receiving the first association request, the interval between the first association request and the second association request by the client is taken into account.

In one embodiment, the deferral of association occurs only when a certain bandwidth utilization criterion is detected on the wireless network. In particular embodiments the criterion can be the number of clients currently associated at the access point, the average client utilization of the clients associated with the access point, the bandwidth capacity through the access point, and the aggregate bandwidth utilization through the access point. In a preferred embodiment, however, the criterion is whether the aggregate bandwidth utilization of the wireless network exceeds a predetermined percentage of the wireless network bandwidth capacity.

BRIEF DESCRIPTION OF THE DRAWINGS

Some of the purposes of the invention having been stated, others will appear as the description proceeds, when taken in connection with the accompanying drawings, in which:

FIG. 5 is an illustration of the type of table that is maintained according to one embodiment of the present invention.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in a specific embodiment," and similar language throughout this specification may, but do not necessarily, all refer to the same embodiment.

Figure 1:
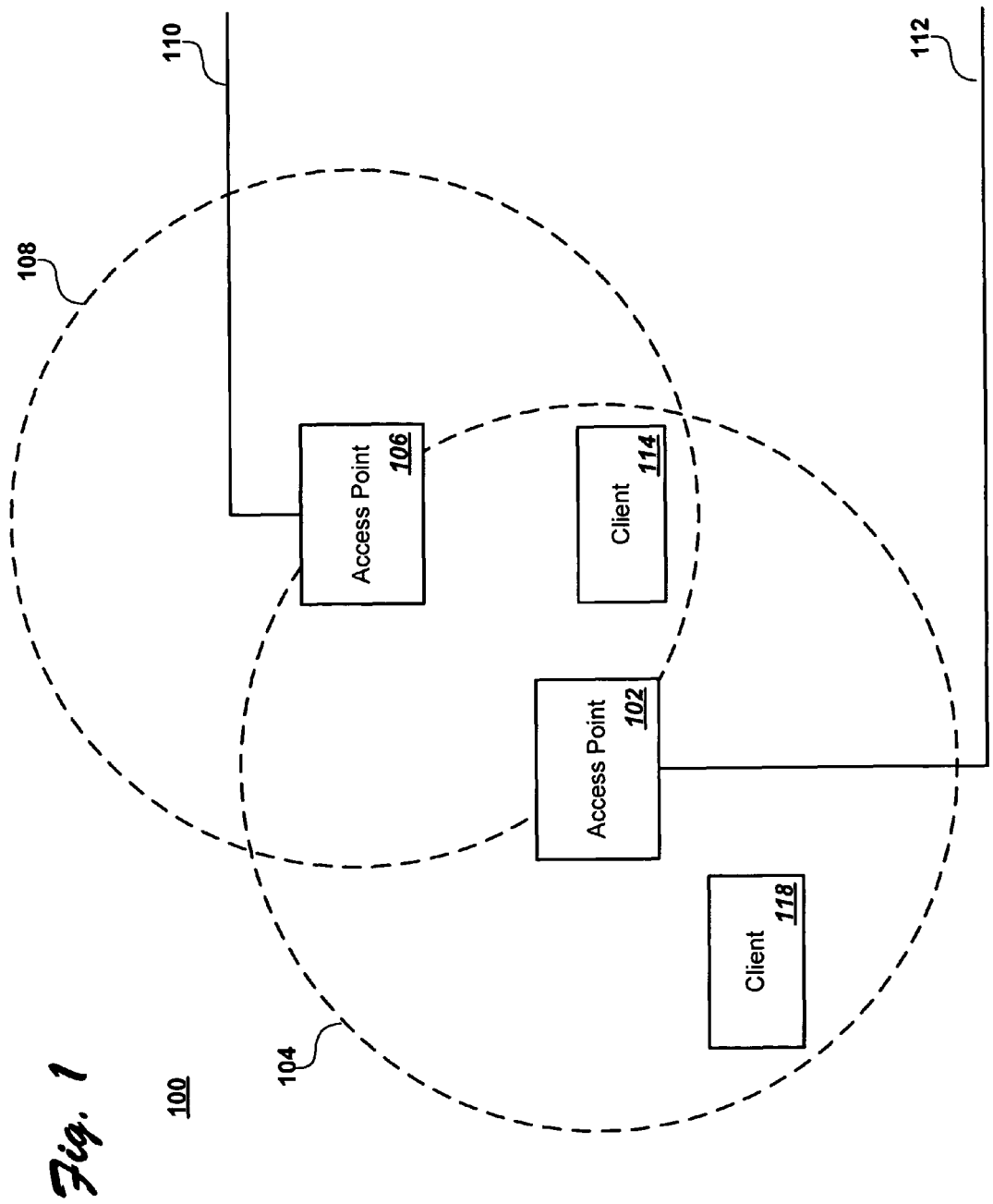
FIG. 1 depicts a scenario in which the concepts of the present invention are advantageous.

Referring now more particularly to the accompanying drawings, FIG. 1 depicts a scenario in which the concepts of the present invention are advantageous. Installation 100 consists of two access points 106 and 102 each having roughly circular geographical areas of coverage 108 and 104 respectively. Access points provide access to distributed resources and services via wireless medium for associated wireless clients or stations. Preferably, access points 106 and 102 contain IEEE 802.11 medium access control functionality and physical layer interface to the wireless medium. Wireless clients 114 and 118 are used here to represent a variety of wireless clients throughout installation 100. The wireless clients 114 and 118 are typically and preferably mobile computing units such as laptops and palmtops. As mobile units, clients 114 and 118 typically would not have printing capabilities nor other resources which would require hardware too large to hand carry. Such printing capabilities and other resources are found on backbone networks 110 and 112 which are coupled, according to installation 100, to two access points 106 and 102 respectively. Access points 106 and 102, in turn, provide the resources and services of the backbone network on to the wireless network in order to make the resources and services available to the wireless clients 114 and 118.

Backbone networks 110 and 112 provide installation 100 with the distributed resources and services. The resources and services include but are not limited to print servers and printers, e-mail servers, fax servers, database servers, and Internet access. Backbone networks 110 and 112 are preferably ethernet local area networks, optionally however, connections 110 and 112 can be wireless or optical distribution schemes to the same resources and services. In addition, backbone connections 110 and 112 can be bridge connections which in turn provide the resources and services of the backbone network.

Wireless clients 114 and 118 and are able to be configured in ad hoc mode and thereby engage in direct peer-to-peer data transfers and sharing of each other's resources when their respective signal strengths allow for direct connection. Otherwise, clients 114 and 118 are able reach each other through the backbone networks 110 and 112; in which case, their communications would be through the access points to which they are associated.

Figure 2:
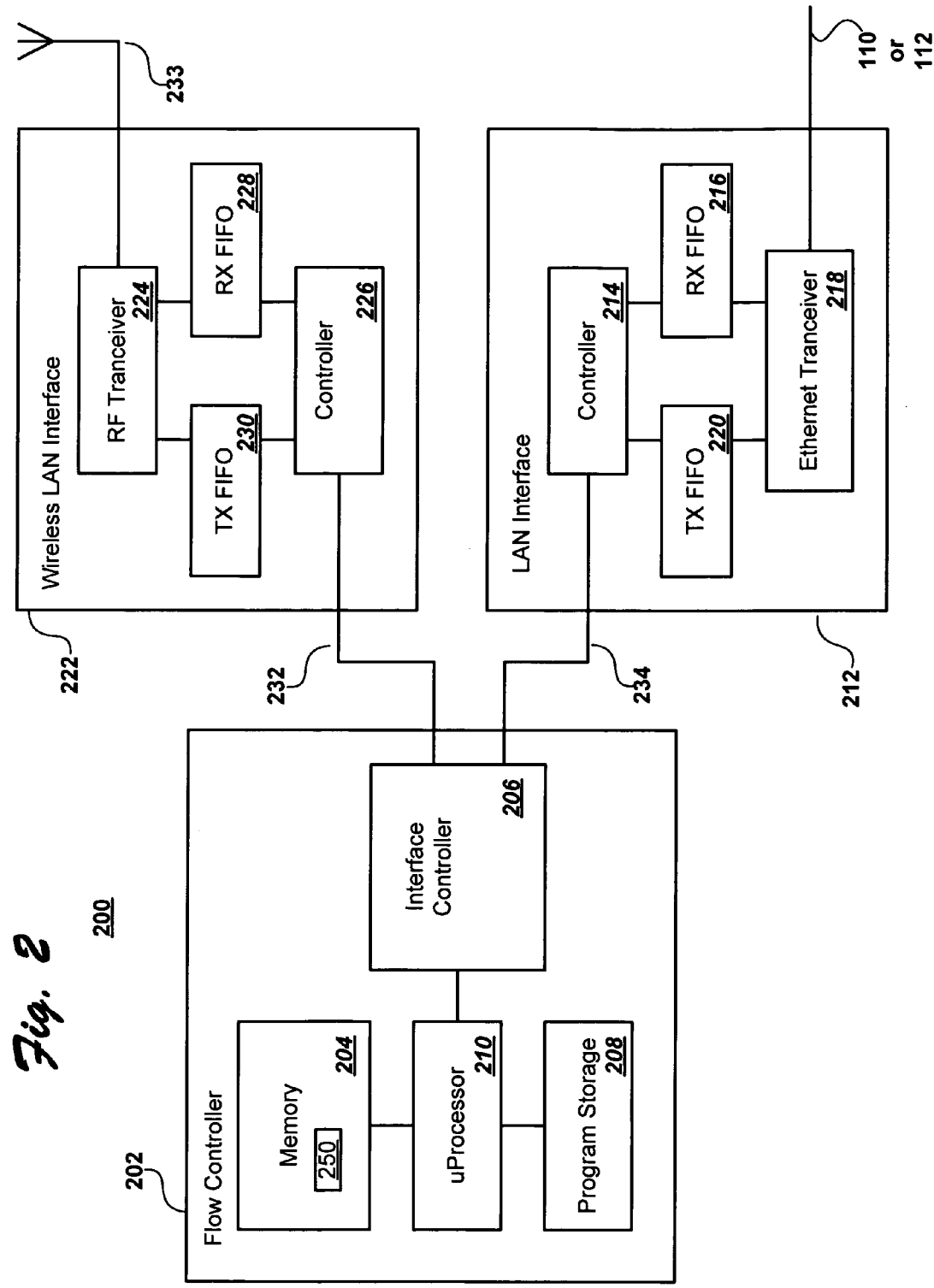
FIG. 2 is a block diagram of an access point configured according to an embodiment of present invention.

FIG. 2 is a block diagram of an access point configured according to an embodiment of present invention. Access point 200 includes wireless LAN interface 222, a bridge FIFO or flow controller 202, and a LAN interface 212. Wireless interface 222 can be any wireless interface using any wireless medium such as RF, infrared, VHF, UHF, and microwave. However, in the preferred embodiment, wireless LAN interface 222 is implemented as an 802.11 compliant wireless local area network interface. LAN interface 212 can be a wired land-based network interface, an optical network interface such as a fiber-optic network interface, or even a second wireless network interface. However, in the preferred embodiment, LAN interface 212 is implemented as an interface for an ethernet land-based network. LAN interface 212 typically connects to or bridges to a backbone network which provides resources and services. Wireless LAN interface 222 provides the resources and services found on the backbone network to wireless clients which are associated to wireless LAN interface 222.

The term—association—as used herein refers to that service which is used to establish access point to client mapping and enable client invocation of the resources and services found on the backbone network.

Bridge FIFO/flow controller 202 bridges and controls the flow of traffic between wireless clients coupled through wireless LAN interface 222 and the backbone network coupled to LAN interface 212. Flow controller 202 maintains a FIFO buffer for bidirectional traffic between interfaces 222 and 212. Flow controller 202 can be implemented entirely in hardware, or partially in hardware and partially in software/firmware. In the preferred embodiment as shown in FIG. 2 however, flow controller 202 is implemented with a microprocessor 210 having program storage 208 which stores boot code and microcode for execution on a microprocessor 210. The boot code is typically executed directly from program storage 208 while the microcode is typically transferred to memory 204 for faster execution. Flow controller 202 also includes an interface controller 206 which performs the lower-level functions including handshaking functions required across interface 232 to the wireless LAN interface 222 and across interface 234 to the LAN interface 212.

The construction of wireless LAN interface 222 includes a physical layer RF transceiver 224, transmit and receive FIFO's 230 and 228 respectively, and a low-level controller 226 for interfacing to the flow controller via interface 232. Wireless LAN interface 222 includes an antenna 233 for coupling electromagnetic energy to the atmosphere. Notice that the term—RF—is used herein as to be consistent with the IEEE 802.11 specifications. Throughout the IEEE 802.11 specifications the direct sequence spread spectrum (DSSS) system therein described targets an RF LAN system having a carried frequency in the 2.4 GHz band designated for industrial, science, and medical (ISM) applications as provided in the USA according to FCC 15.247. In other words, the actual modulation frequencies used by the RF transceiver 224 are in the 2.4 GHz microwave ISM band rather than in the frequency band traditionally known as "RF."

The construction of LAN interface 212 includes a physical layer ethernet transceiver 218, transmit and receive FIFO's 220 and 216 and a low-level controller 214 for interfacing to the flow controller via interface 234. Ethernet transceiver 218 is coupled to the backbone network 110 or 112.

Controller's 226 and 214 can be implemented in hardware, or as a combination of hardware and software/firmware components. In the preferred embodiment however, controllers 226 and 214 are implemented in hardware for faster operation.

Wireless LAN interface 222 and LAN interface 212 implement at least the physical and medium access control layers of the ISO LAN networking model. Higher ISO layers are implemented in the flow controller 202. However, it is possible to implement the higher layers of the ISO model in interfaces 222 and 212.

Further details concerning the construction and use of access point 200 shall be described in relation to the flow charts which follow. Certain details concerning the construction and use of access points are well known in the art and are omitted so as to not obfuscate the present disclosure in unnecessary detail.

Figure 3:
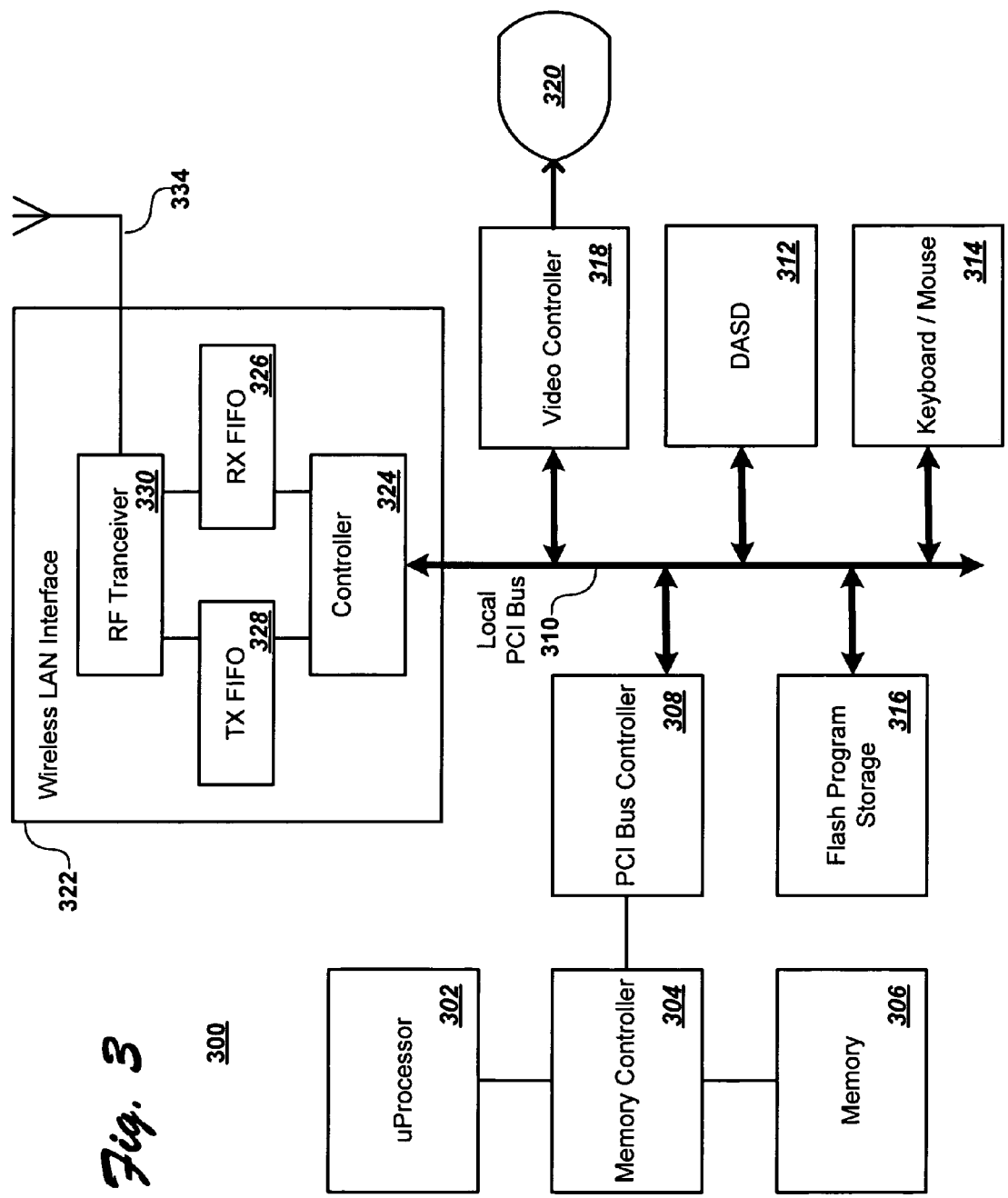
FIG. 3 is a block diagram of a client configured according to an embodiment of the present invention.

FIG. 3 is a block diagram of a client configured according to an embodiment of the present invention. The client 300 includes a physical layer RF transceiver 322, transmit and receive FIFO's 328 and 326 respectively, and a low-level controller 324 for interfacing to other components of client 300 through PCI bus 310. Wireless LAN interface 322 includes an antenna 334 for coupling electromagnetic energy to the atmosphere. Controller 300 further includes video controller 318 which provides control signals to video LCD display 320. PCI bus controller 308 operationally couples a variety of modules within client 300. A standard processing subsection is coupled to PCI bus controller 308 and consists of a microprocessor 302, a memory controller 304, and to memory 306. Microprocessor 302 receives its boot code from flash program storage 316 through PCI bus controller 308. A storage module 312 provides the client with DASD storage for storing application software and application data, and for storing and executing operating system code. Client 300 also includes a keyboard and mouse interface 314 which is coupled to PCI bus controller 308. Keyboard and mouse interface 314 accepts user input from a supplied keyboard and mouse. Establishing association and wireless connection to access point 200 according to the logic shown in FIG. 4, for which a detailed description shall be given in the description which follows, can be performed by controller 324 of wireless LAN interface 322 or by the microprocessor 302 and the controller 324. However in the preferred embodiment the association and wireless connection to access point 200 is implemented entirely in controller 324 according to logic depicted in FIG. 4.

Figure 4:
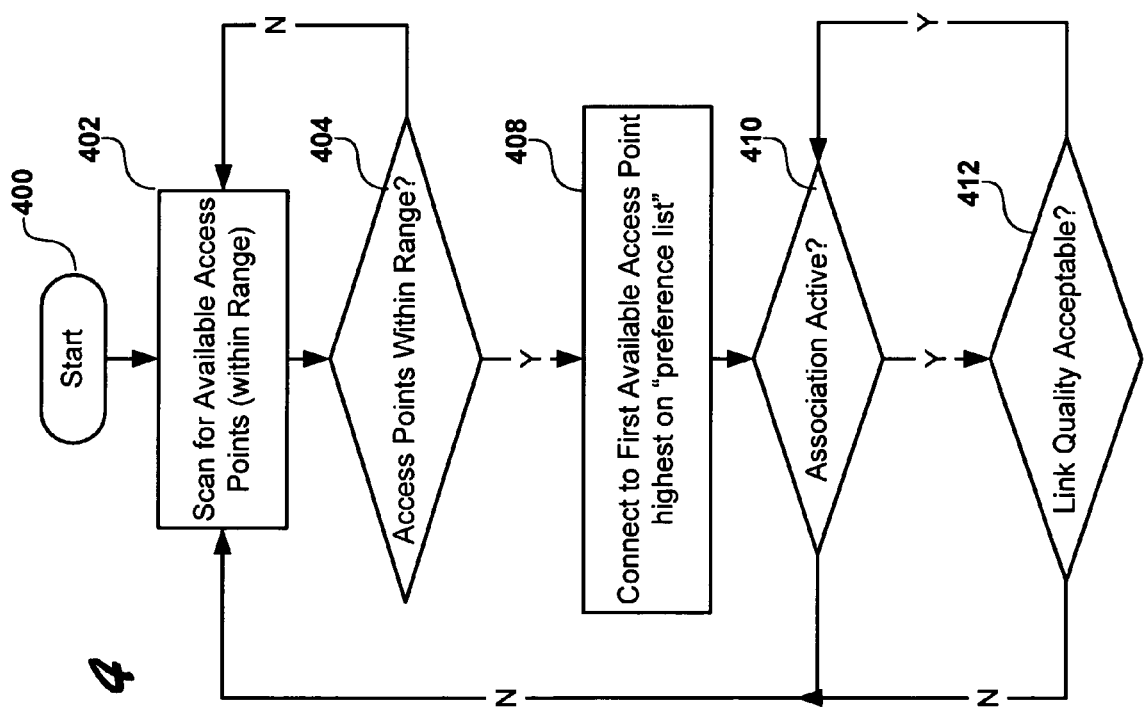
FIG. 4 is a flow diagram depicting the logic exercised by the client of FIG. 3 in maintaining and/or establishing association with the access point of FIG. 2.

FIG. 4 is a flow diagram depicting the logic exercised by the client of FIG. 3 in maintaining and/or establishing association with the access point of FIG. 2. Initially 400, client 300 scans 402 for any available access points with in its geographical range. A decision 404 is then made regarding whether access points are found. If none are found, client 300 continues to scan 402 for available access points. If one or more access points are found, client 300 will associate and connect 408 to the first available access point which is found to be highest on a predetermined preference list. The preference list can be entered by a user or entered automatically by system administrators through the network upon initial setup. A user would tend to enter, toward the top of list, the access points with which they have had the most success. Often, this is an access point closest to where the user normally physically resides and therefore, by virtue of its proximity to the user, provides the highest signal strength and gives the best signal quality. The client 300 then makes a two phase 410 and 412 determination as to the status of the association and link. First, a determination 410 is made as to whether the association remains active. If the association is not active, client 300 then continues to scan 402 for available access points. If the association is still active, client 300 then makes a determination 412 as to whether the link quality is acceptable. Link quality does not remain static for a variety of different reasons and therefore must be checked periodically. For example, if the client 300 is roaming, i.e., physically moving whether by public transit, automobile, or on foot, access point signal strength will diminish as the client moves away from the access point. Alternatively, link quality can degrade due to external electromagnetic interference. When it is determined 412 that the link quality is acceptable, client 300 maintains the association and proceeds to monitor the status 410 and the quality 412 of the connection. If it is determined 412 that the link quality is not acceptable, client 300 ventures out and scans 402 for alternative access points which might be available within its range in attempting to find a link with a higher level of signal quality.

FIG. 5 is an illustration of the type of table that is maintained according to one embodiment of the present invention. Table 250 illustrated in FIG. 5 is maintained by access point 200 as an aid in determining which clients are to be associated. The logic to be described in relation to FIG. 6 utilizes the data variables stored in table 250 in making client association decisions and in response to the occurrence of a bandwidth utilization criterion on the wireless network. Table 250 is maintained in memory 204 of flow controller 202 found in FIG. 2.

Area 502 of table 250 maintains an enumeration for identifying the clients which are associated to access point 200. Optionally, any form of identifier or tag can be used in area 502. Area 504 contains the IP address of each associated client. Optionally, area 504 may contain the network name of each associated client or any other equivalent identifier. For each client, and area 506 is maintained for recording the average bandwidth utilized by each client. Entry 508 of table 250 contains the aggregate bandwidth which is calculated by summing the average bandwidth of all clients which are associated to access point 200.

In other embodiments, entry 508 may contain the sum of the peak bandwidth of each client, the sum of the minimum bandwidth of each client, the sum of the root mean square of the bandwidth of each client, the convolution of the average bandwidth of each client over a specific time window, and/or any other aggregation. However, the sum of the average bandwidth is the preferred embodiment at the present time due to processing horsepower limitations on access point 200.

Figure 6:
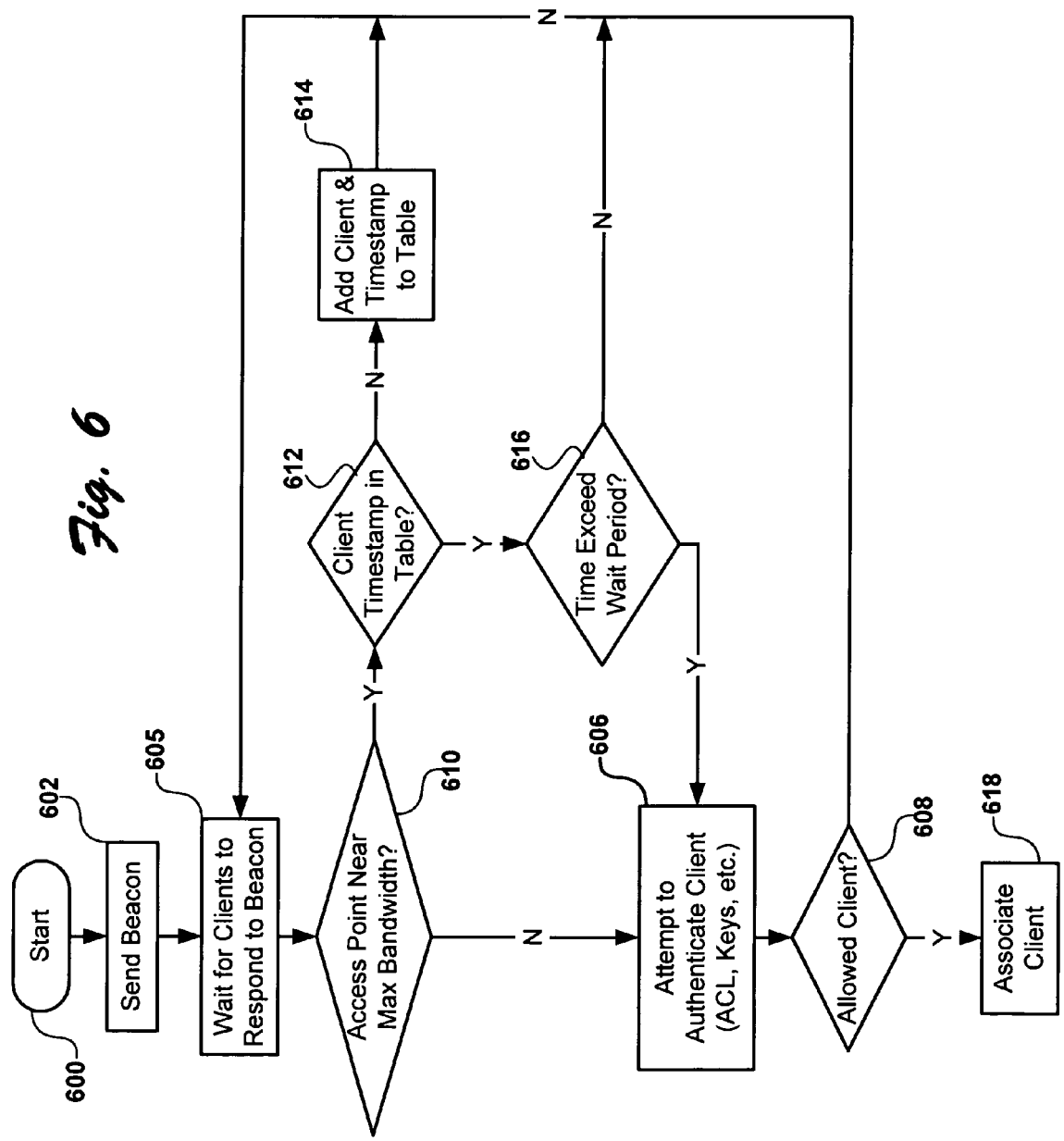
FIG. 6 is a flow diagram showing the logic exercised by the access point of FIG. 2 according to an embodiment of the present invention.

Area 510 and area 512 of table 250 are reserved for maintaining a log of pending clients. As will be discussed in more detail in relation to the description of FIG. 6, area 510 of table 250 contains a unique identifier for the client which has beaconed access point 200 for access to the backbone. The unique identifier can be the name or the IP address of the beaconing client. Area 512 contains an entry representative of the point in time when the last beacon was received from a particular client. Alternatively, an entry which is representative of the point in time when the first beacon was received can be stored in area 512 of table 250. As another alternative, area 512 may contain an entry representative of that point in time when a first or a last beacon was received within a particular interval of time; this implementation is effective in discarding timestamps which are not within an interval of interest.

FIG. 6 is a flow diagram showing the logic exercised by the access point 200 of FIG. 2 according to an embodiment of the present invention. Referring now to FIG. 6 and to FIGS. 2 and 5, processor 210 of flow controller 202 maintains table 250 in memory 204 of access point 200. Interface controller 206 monitors the flow of traffic to and from the LAN interface 212 and wireless LAN interface 222 and reports results to processor 210. Processor 210 maintains areas 502, 504, 506, and 508 in table 250 for each associated client on the wireless network coupled through interface 222, and maintains areas 510 and 512 for each client beaconing for access through access point 200. In the preferred embodiment, processor 210 of flow controller 202 executes the logic illustrated in FIG. 6. However, other embodiments are envisioned in which logic of FIG. 6 is executed entirely in hardware or alternatively in some combination of hardware and software or firmware. Execution begins 600 with the transmission 602 of a beacon identifying the availability of resources and services through access point 200. The beacon itself identifies the access point. Clients are preprogrammed to identify such beacons as providing availability to resources and services on the backbone. The access point then waits 605 for clients to respond to the beacons. When at least one client has responded to the beacon, a determination 610 is then made as to whether access point 200 is near its maximum bandwidth capability. Notice that the operations performed with respect to FIG. 6 are performed while the backbone is still active and do not apply during a network outage condition. If it is determined 610 that the access point 200 is near its maximum bandwidth capability, measures 612, 614, and 616 are taken in an effort to steer responding clients to other access points which may have more bandwidth capability. If it is determined that access point 200 is not near its maximum bandwidth capacity, measures 606, 608, and 618 are taken in associating the client in the usual manner. Measures 612, 614, and 616 are performed in the following manner when the determination 610 is that the access point is near its maximum bandwidth. First it is determined 612 whether the client responding to the beacon has an entry in area 510 of table 250. If the client does not have an entry, the client is added 614 to area 510 of table 250 as a pending client; in addition a timestamp is added to area 512 indicating the time the beacon from the client was received. In this case, the client does not receive a response from the access point and the client is not associated. Instead of associating the client, access point 200 continues to wait 605 for clients to respond to the beacons. By deferring the client in this fashion, the client is incented to seek association with another access point. Should the client associate with another access point, load balancing is achieved in that an access point which is near its maximum capacity has offloaded the association of a new client to an access point which has more capacity. If the second access point is following the same algorithm, the timestamp in the first access point will be earlier than timestamp in the second access point leading to the eventual client association to the first access point by virtue of the earlier timestamp in the first access point. However, should the client fail to find an alternative access point through which to connect to the backbone, the procedure which follows allows for the client to eventually associate. When it is determined 612 that the client does have an entry 510 in table 250, this indicates that the client has recently responded to a beacon but has been denied a response. The return of this client indicates that no other access point has been found by the client. In the preferred embodiment, it is then determined 616 whether the timestamp entry 512 in table 250 indicates that the client has been delayed for at least a predetermined wait period. In other embodiments, no time is required and a second request to associate can be accepted. If 616 the time period has not been exceeded, the client is not associated and access point 200 continues by waiting 605 for clients to respond to beacons. However, when it is determined 616 that the predetermined time period has been exceeded, the client is associated as per measures 606, 608, and 618.

The determination 610 of FIG. 6 which determines whether the access point is near its maximum bandwidth capacity is made with reference to entry 508 indicating the aggregate bandwidth of the access point. The aggregate bandwidth, as recorded in entry 508, is compared against a predetermined threshold. When the aggregate bandwidth exceeds the predetermined threshold, a determination 610 is made that the access point is near its maximum bandwidth capacity. When the aggregate bandwidth is lower in magnitude as compared to the predetermined threshold, a determination 610 is made that the access point is not near its maximum bandwidth capacity and will accept client associations without the lead. In a preferred embodiment, the predetermined threshold is 70 percent. In one embodiment, the threshold is 50 percent.

Thus, an example will be now be given in accordance with the logic of FIG. 6 as executed by processor 210 of flow controller 202 of access point 200 in maintaining a load balanced wireless local area network. Referring now to the scenario 100 given in FIG. 1, assume that neither of clients 118 and 114 are associated to any access point. Also, assume that both backbone's 110 and 112 are operational and that access point 106 is below the predetermined aggregate bandwidth threshold and that access point 102 has associated a number of clients which are active enough to have exceeded the predetermined aggregate bandwidth threshold. According to the logic of FIG. 6, client 114 responds to beacons from both access points 102 and 106. Since access point 102 is above the predetermined aggregate threshold, an entry is made into table 250 for client 114 and the association of client 114 is deferred. Meanwhile, since access point 106 is below the aggregate bandwidth threshold, access point 106 associates client 114 without delay. As a result of the association with access point 106, access point 102 will never receive a second response to a beacon. Load balancing between the two access points has therefore been achieved with respect to client 114. With respect to client 118, client 118 will only hear a beacon from access point 102 and will respond accordingly. Access point 102 will defer the association of client 118 as described. Since client 118 has no other access point option, client 118 will continue to respond to beacons transmitted by access point 102, and eventually, the predetermined time period will be exceeded and client 118 will be associated to access point 102 even though access point 102 is above its predetermined aggregate bandwidth threshold.

In the drawings and specifications there has been set forth a preferred embodiment of the invention and, although specific terms are used, the description thus given uses terminology in a generic and descriptive sense only and not for purposes of limitation.

We claim as our invention:

1. Apparatus comprising:
    a wireless network interface; and
    a flow controller which is coupled to said wireless network interface and which defers an association of a client providing a first association request through said wireless network interface and associates the client in response to a receipt of a second association request provided by the client through said wireless network interface;
    wherein the deferral is performed while network capacity is available through said wireless network interface.

2. Apparatus of claim 1 wherein said flow controller associates the client if the interval between the first association request and the second association request exceeds a predetermined interval.

3. Apparatus of claim 2 wherein said deferral of association occurs in response to a detection of a bandwidth utilization criterion on the wireless network.

4. Apparatus of claim 3 wherein the bandwidth utilization criterion of said detection includes a criterion selected from the group consisting of number of clients associated, average client bandwidth utilization, bandwidth capacity, and aggregate bandwidth utilization.

5. Apparatus of claim 4 wherein the criterion is whether the aggregate bandwidth utilization of the wireless network exceeds a predetermined percentage of the wireless network bandwidth capacity.

6. Apparatus comprising:
    a wireless network interface;
    a flow controller which is coupled to said wireless network interface and which includes:
        a processor; and
        a computer readable storage device encoded with computer executable instructions, which, when executed by the processor, causes the processor to:
        detect a bandwidth utilization criterion on said wireless network interface;
        receive a first association request from a client through said wireless network interface;
        defer the association of the client in response to said detection and in response to said first reception;
        maintain a table in the memory which includes first and second related entries, the first entry identifies the client making the association request and the second entry includes a timestamp which indicates the time of said first reception;
        receive a second association request from the client;
        determine whether the time of said second reception exceeds a predetermined interval by comparing the time of said second reception to the timestamp in the second entry which corresponds to the client; and
        decide whether the client is to be associated based on said determination;
    wherein the deferral is performed while network capacity is available through said wireless network interface.

7. Apparatus of claim 6 wherein said decision is to associate the client responsive to said determination that the predetermined interval has been exceeded.

8. Apparatus of claim 6 wherein said decision is to refuse association of the client responsive to said determination that the predetermined interval has not been exceeded.

9. Apparatus of claim 6 wherein the bandwidth utilization criterion of said detection includes a criterion selected from the group consisting of number of clients associated, average client bandwidth utilization, bandwidth capacity, and aggregate bandwidth utilization.

10. Apparatus of claim 9 wherein the criterion is whether the aggregate bandwidth utilization of the wireless network exceeds a predetermined percentage of the wireless network bandwidth capacity.

11. A method comprising:
    deferring the association of a client on a wireless network in response to a first association request provided by the client;
    receiving a second association request which is provided by the client; and
    associating the client in response to said reception of the second association request;
    wherein said deferral is performed while network capacity is available on the wireless network.

12. The method of claim 11 wherein said association of the client is conditional and wherein the association depends on whether the interval between the first association request and the second association request exceeds a predetermined interval.

13. The method of claim 12 wherein said deferral of association occurs in response to detecting a bandwidth utilization criterion on the wireless network.

14. The method of claim 13 wherein the bandwidth utilization criterion of said detection includes a criterion selected from the group consisting of number of clients associated, average client bandwidth utilization, bandwidth capacity, and aggregate bandwidth utilization.

15. The method of claim 14 wherein the criterion is whether the aggregate bandwidth utilization of the wireless network exceeds a predetermined percentage of the wireless network bandwidth capacity.

16. A method comprising:
    detecting a bandwidth utilization criterion on a wireless network;
    receiving a first association request from a client on the wireless network;
    deferring the association of the client in response to said detection and in response to said first reception;
    maintaining a table in memory which includes first and second related entries, the first entry identifying the client making the association request and the second entry including a timestamp which indicates the time of said first reception;
    receiving a second association request from the client;
    determining whether the time of said second reception exceeds a predetermined interval after the time of said first reception by comparing the time of said second reception to the timestamp in the second entry which corresponds to the client; and deciding whether the client is to be associated based on said determination;

wherein said deferral is performed while network capacity is available on the wireless network.

17. The method of claim 16 wherein said decision is to associate the client responsive to said determination that the predetermined interval has been exceeded.

18. The method of claim 16 wherein said decision is to refuse association of the client responsive to said determination that the predetermined interval has not been exceeded.

19. The method of claim 16 wherein the bandwidth utilization criterion of said detection includes a criterion selected from the group consisting of number of clients associated, average client bandwidth utilization, bandwidth capacity, and aggregate bandwidth utilization.

20. The method of claim 19 wherein the criterion is whether the aggregate bandwidth utilization of the wireless network exceeds a predetermined percentage of the wireless network bandwidth capacity.

21. A computer readable storage device containing computer executable instructions which, when executed by a computer, cause the computer to:

defer an association of a client on a wireless network in response to a first association request provided by the client;

receive a second association request which is provided by the client; and associate the client in response to said reception of the second association request;

wherein said deferral is performed while network capacity is available on the wireless network.

22. The computer readable storage device of claim 21 wherein said association of the client is conditional and wherein the association depends on whether the interval between the first association request and the second association request exceeds a predetermined interval.

23. The computer readable storage device of claim 22 wherein said deferral of association occurs in response to a detection of a bandwidth utilization criterion on the wireless network.

24. The computer readable storage device of claim 23 wherein the bandwidth utilization criterion of said detection includes a criterion selected from the group consisting of number of clients associated, average client bandwidth utilization, bandwidth capacity, and aggregate bandwidth utilization.

25. The computer readable storage device of claim 24 wherein the criterion is whether the aggregate bandwidth utilization of the wireless network exceeds a predetermined percentage of the wireless network bandwidth capacity.

26. Apparatus comprising:

a computer readable storage device containing computer executable instructions which, when executed by a computer of a flow control coupled to a wireless network interface, cause the computer to:

detect a bandwidth utilization criterion on a wireless network;

receive a first association request from a client on the wireless network;

defer the association of the client in response to said detection and in response to said first reception;

maintain a table in memory which includes first and second related entries, the first entry identifying the client making the association request and the second entry including a timestamp which indicates the time of said first reception;

receive a second association request from the client;

determine whether the time of said second reception exceeds a predetermined interval after the time of said first reception by comparing the time of said second reception to the timestamp in the second entry which corresponds to the client; and decide whether the client is to be associated based on said determination;

wherein said deferral is performed while network capacity is available on the wireless network.

27. The apparatus of claim 26 wherein said decision is to associate the client responsive to said determination that the predetermined interval has been exceeded.

28. The apparatus of claim 26 wherein said decision is to refuse association of the client responsive to said determination that the predetermined interval has not been exceeded.

29. The apparatus of claim 26 wherein the bandwidth utilization criterion of said detection includes a criterion selected from the group consisting of number of clients associated, average client bandwidth utilization, bandwidth capacity, and aggregate bandwidth utilization.

30. The apparatus of claim 29 wherein the criterion is whether the aggregate bandwidth utilization of the wireless network exceeds a predetermined percentage of the wireless network bandwidth capacity.

* * * * *